United States Patent [19]

Jervis et al.

[11] 3,925,215

[45] Dec. 9, 1975

[54] ANTIOXIDANT MIXTURE COMPRISING A MIXTURE OF PHENOTHIAZINE ORALKYL SUBSTITUTED PHENOTHIAZINE AND AN OXIDIZED DIARYLAMINE AND LUBRICATING OILS CONTAINING SAID ANTIOXIDANT MIXTURE

[75] Inventors: Graham James Jervis, Abingdon; Robert Robson, Wantage, both of England

[73] Assignee: Exxon Research & Engineering Co., Linden, N.J.

[22] Filed: May 2, 1974

[21] Appl. No.: 466,240

[30] Foreign Application Priority Data

May 11, 1973 United Kingdom............. 22618/73

[52] U.S. Cl............................. 252/47.5; 252/402
[51] Int. Cl.² ................ C10M 1/38; C10M 3/32; C09K 15/26
[58] Field of Search........................ 252/47.5, 402

[56] References Cited

UNITED STATES PATENTS

| 2,930,758 | 3/1960 | Tierney et al................. 252/47.5 X |
| 3,218,256 | 11/1965 | Edwards et al.................. 252/47.5 |
| 3,344,068 | 9/1967 | Waight et al..................... 252/47.5 |
| 3,414,618 | 12/1968 | Randell........................ 252/47.5 X |
| 3,869,394 | 3/1975 | Daniels et al................ 252/47.5 X |

FOREIGN PATENTS OR APPLICATIONS 1,224,556  3/1971  United Kingdom............... 252/47.5

Primary Examiner—Delbert E. Gantz
Assistant Examiner—Andrew H. Metz
Attorney, Agent, or Firm—Byron O. Dimmick

[57] ABSTRACT

An antioxidant composition especially suitable for synthetic lubricants comprises a mixture of (A) one or more oxidised diarylamines e.g. oxidised di-t-octyl diphenylamine, and (B) one or more thiodiarylamines, e.g. phenothiazine. Marked synergism is shown between A and B.

6 Claims, No Drawings

ANTIOXIDANT MIXTURE COMPRISING A MIXTURE OF PHENOTHIAZINE ORALKYL SUBSTITUTED PHENOTHIAZINE AND AN OXIDIZED DIARYLAMINE AND LUBRICATING OILS CONTAINING SAID ANTIOXIDANT MIXTURE

This invention relates to antioxidants, especially those for use in aviation lubricants.

Certain oxidised alkylated diarylamine compounds have been proposed as antioxidants, especially for synthetic ester lubricants. We have unexpectedly found that there is marked synergism when using a combination of oxidised diarylamines and a thiodiarylamine.

According to this invention an antioxidant, especially suitable for aviation lubricants, comprises a mixture of (A) one or more oxidised diarylamines, and (B) one or more thiodiarylamines.

The preferred diarylamines from which component (A) is derived are alkylated diarylamines having the formulae:

$$A^1 — NH — A^2 \quad (1)$$

or

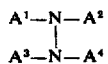

where $A^1$ represents

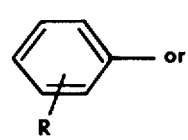

and $A^2$, $A^3$ and $A^4$ are aryl or naphthyl groups similar to $A^1$ and also having respectively $R^2$, $R^3$ and $R^4$ substituents, $R^1$, $R^2$, $R^3$ and $R^4$ being alkyl groups or hydrogen atoms. It is preferred that in formula (1) at least one of the groups $A^1$ and $A^2$ has an alkyl substituent and that in formula (2) at least one of the groups $A^1$, $A^2$, $A^3$ and $A^4$ has an alkyl substituent.

The groups $R^1$, $R^2$, $R^3$ and $R^4$ when alkyl groups preferably each contain 1 to 12 carbon atoms, e.g. they are methyl, isopropyl, sec-butyl, n-hexyl, n-octyl, n-decyl or n-dodecyl groups. When the alkylated diarylamine has the formula (1) it is preferable that both $R^1$ and $R^2$ are alkyl groups. Likewise when the alkylated diarylamine has the formula (2), it is preferable if all of the groups $R^1$, $R^2$, $R^3$ and $R^4$ are alkyl groups.

When the groups $A^1$, $A^2$, $A^3$ and $A^4$ are aryl groups, $R^1$, $R^2$, $R^3$ and $R^4$ when alkyl groups, are preferably in the para position with respect to the nitrogen atom. when the groups $A^1$, $A^2$, $A^3$ and $A^4$ are naphthyl groups, $R^1$, $R^2$, $R^3$, and $R^4$ are preferably in the 1-position when they are alkyl groups e.g.

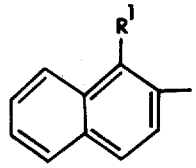

Preferred diarylamines are di-n-heptyl, di-n-decyl, di-t-butyl and especially di-t-octyl diphenylamines.

To prepare component (A), i.e. the oxidised diarylamine, the diarylamine may be oxidised by known oxidation methods, preferably by melting the diarylamine and blowing molecular oxygen through the molten or liquid mass. Alternatively, the diarylamine may be dissolved in a solvent which is inert under the reaction conditions before blowing with molecular oxygen. The source of molecular oxygen is conveniently supplied as air and it is advantageous to remove continuously water produced during the oxidation process.

A particularly suitable method is to heat to about 200°C certain diarylamines, for example, dioctyl diphenylamine with anhydrous sodium acetate and blow in oxygen. The resulting mass is then extracted with toluene, washed with water and dried with anhydrous sodium sulphate. The desired product is then obtained by removal of the solvent by heating to about 100°C under vacuum.

Suitable conditions and methods for the oxidation of diarylamines are described in the specification of U.K. Pat. No. 1,224,556. Briefly described, the oxidation is performed by contacting the diarylamine with oxygen or air at a temperature of 150° to 250°C. until the product has an oxygen content of from 0.5 to 2.5 gram atoms of oxygen per gram atom of nitrogen. The oxidation can be promoted by having present from 0.01 to 2 weight percent, based on the weight of the diarylamine, of an alkali metal salt of a fatty acid of from 1 to 20 carbon atoms or of an alkali metal salt of phenol or of an alkylated phenol having alkyl groups of from 1 to 12 carbon atoms.

Oxidation under these conditions gives rise to a complex mixture of compounds. Analysis suggests that the structure of the R groups is unaffected by the oxidation, and that the changes which occur involve the amine group with the possible formation of one or more urea derivatives.

Compound (B) of the antioxidant is a thiodiarylamine, and the preferred thiodiarylamines have the general formula:

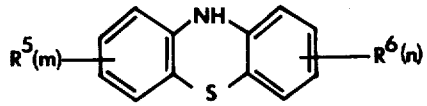

where $R^5$ and $R^6$ are hydrocarbyl groups and $m$ and $n$ are each zero or integers of from 1 to 4. $R^5$ and $R^6$ are preferably alkyl groups, e.g. $C_1$ to $C_6$ alkyl groups such as methyl, ethyl, n-propyl or n-hexyl, but they may be other hydrocarbyl groups such as alkenyl. When m and n are one $R^6$ is preferably in the 3 position and $R^5$ is preferably in the 7 position i.e.:

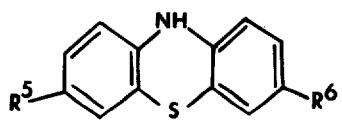

When $m$ and $n$ are integers of 2 to 4 it is to be understood that each group $R^5$ and each group $R^6$ can be different if desired. The preferred thiodiarylamine is however unsubstituted phenothiazine, (i.e. when $m$ and $n$ are both zero). However when $m$ and $n$ are integers it is preferred that they are both one, such as 3,7-dioctyl phenothiazine and 3,7-didecyl phenothiazine.

The weight ratio of components A and B can vary but the preferred weight ratios lie between 20:1 and 1:2, e.g. about 5:1.

The antioxidant may be added to a lubricating oil. When the antioxidant is added to a lubricating oil, it should preferably be added in minor proportion, preferably 0.001 to 10.0% by weight, e.g. 0.1 to 5.0% by weight, based on the weight of lubricating oil.

The antioxidant is preferably added to a synthetic ester lubricating oil, and suitable diesters include diesters of the general formula:

ROOCR¹COOR and RCOOR¹OOCR where R represents a $C_6$ to $C_{12}$ alkyl group, while $R^1$ represents a $C_4$ to $C_{10}$ saturated aliphatic hydrocarbon group or an ether-interrupted saturated aliphatic hydrocarbon group. The above types of esters may be prepared from alcohols and dicarboxylic acids or glycols and monocarboxylic acids.

Another suitable class of ester lubricant are the polyesters which are prepared by reacting polyhydric alcohols, e.g. those having 2 to 12 hydroxyl groups per molecule and 2 to 40 carbon atoms per molecule, such as trimethylolpropane, pentaerythritol and di-pentaerythritol with mono - and/or di-carboxylic acids such as butyric acid, caprylic acid and pelargonic acid, or adipic, sebacic or azelaic acids.

The complex esters which may be used as base oils are formed by esterification reactions between a dicarboxylic acid, a glycol and an alcohol and/or monocarboxylic acid.

Particularly suitable lubricants are esters of polyhydric alcohols having the formula

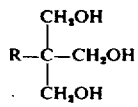

where R is a —$CH_2OH$ group or an alkyl group, e.g. an alkyl group containing 1 to 6 carbon atoms. Thus, suitable esters of this type are the neopentyl polyol esters of trimethylol ethane, trimethylol propane, trimethylol butane, pentaerythritol or di-pentaerythritol.

The preferred acids used to esterify trimethylol propane are the $C_4$ to $C_{12}$ monocarboxylic acids. Particularly preferred are the $C_7$-$C_{10}$ esters, e.g. $C_8$ (caprylic) and $C_9$ (pelargonic) acid esters. Mixtures of these $C_7$-$C_{12}$ acids may be used. When such an acid mixture is used, it is preferred that the mixture averages between $C_8$ and $C_9$. Although more difficult to form, it is even more preferred that one methylol group be esterified with a neo-heptanoic acid, e.g. 2,2-dimethylpentonoic acid, and the remaining methylol groups esterified with non-hindered acids, e.g. pelargonic acid. This particular ester is substantially as thermally stable as the completely hindered ester but has superior volatility and low temperature characteristics. The preferred acids used to esterify pentaerythritol are the $C_4$-$C_{10}$ monocarboxylic acids with the more preferred esters being those of $C_5$ to $C_9$ acids, e.g. n-valeric, isovaleric, 2-ethyl butyric, caproic, n-heptylic, n-octanoie or 2-ethyl hexoic acids or a mixture of $C_5$ to $C_9$ acids. Similarly mixtures of pentaerythritol and di-pentaerythritol may be esterified with mixtures of $C_5$ to $C_9$ monocarboxylic acids.

Alternatively the lubricating oil can be a mineral lubricating oil.

Other additives which may be incorporated in the lubricating oil include corrosion inhibitors, e.g. sebacic acid, a metal deactivator such as quinizarin, a foam inhibitor, e.g. a silicone polymer such as dimethyl silicone, or an antiwear additive, e.g. neutral alkyl phosphates such as tricresyl phosphate, neutral aryl phosphates, or neutral phosphonates.

EXAMPLE

Oxidised dioctyldiphenylamine was prepared by heating 4,4¹-di-t-octyldiphenylamine with anhydrous sodium acetate at 200°C for 48 hours and blowing in oxygen at the rate of 150 ml/min. The product was extracted with toluene, washed with water and dried over anhydrous sodium sulphate. The desired product, a glassy solid, was obtained by removal of solvent under vacuum at 100°C. 4,4¹-di-t-octyldiphenylamine, the oxidised product thereof, and phenothiazine were all separately added to a synthetic ester lubricant consisting of 1 wt.% % tricresyl phosphate in a mixture of complete esters obtained by esterification of 90 wt.% pentaerythritol and 10 wt.% dipentaerythritol with a mixture of $C_6$ to $C_{10}$ fatty acids, and subjected to the Rolls Royce (RR 1001) oxidation test.* The results were compared with the same synthetic ester containing the antioxidant of the invention. The superiority of the latter is clearly shown from the following results:

| Rolls Royce RR 1001 Oxidation Tests at 215°C for 192 hours | | | |
|---|---|---|---|
| % Volatility | Induction Period(Hr) | ΔTAN | ΔKV210°F,% |
| 2% dioctyldiphenyl- amine (DODPA)  56.0 | 0 | Solid on 5th Day | |
| 2% Oxidised DODPA  56.2 | 24 | Solid on 6th Day | |
| 2% Oxidised DODPA + 0.4% Phenothiazine  30.6 | >192 | 6.44 | 67.0 |
| 0.4% Phenothiazine  45.0 | 20 | Solid after 108 hours. | |

*D.Eng. R. D.2497 Supplement Method No. 12.

What is claimed:
1. An antioxidant comprising a mixture of:
   A. at least one thiodiarylamine from the group consisting of phenothiazine and 3,7-dialkyl phenothiazines having alkyl groups of from 1 to 10 carbon atoms, and
   B. at least one oxidized diarylamine, the diarylamine being selected from the group consisting of those having the formula:

$$A^1—NH—A^2$$ (1)

or (2) 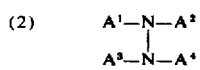

wherein $A^1$-$A^4$ represent an alkyl substituted phenyl or naphthyl group, wherein the alkyl groups have from 1 to 12 the oxidized diarylamine having been obtained by contacting the diarylamine with air or oxygen at from 150° to 250°C. until a product is obtained having from 0.5 to 2.5 gram atoms of oxygen per gram atom of nitrogen, the weight ratio of (A) to (B) being between 20:1 and 1:2.

2. An antioxidant according to claim 1 wherein (B) is the product of oxidizing 4,4'-di-tert.-octyl diphenylamine.

3. An antioxidant according to claim 1 wherein (A) is phenothiazine.

4. A lubricating oil composition comprising a major proportion by weight of a lubricating oil and an antioxidant amount by weight of the antioxidant claimed in claim 1.

5. A composition according to claim 4 wherein the lubricating oil is synthetic ester lubricating oil.

6. A composition according to claim 5 wherein the oil comprises an ester of pentaerythritol.

* * * * *